United States Patent Office 3,391,707
Patented July 9, 1968

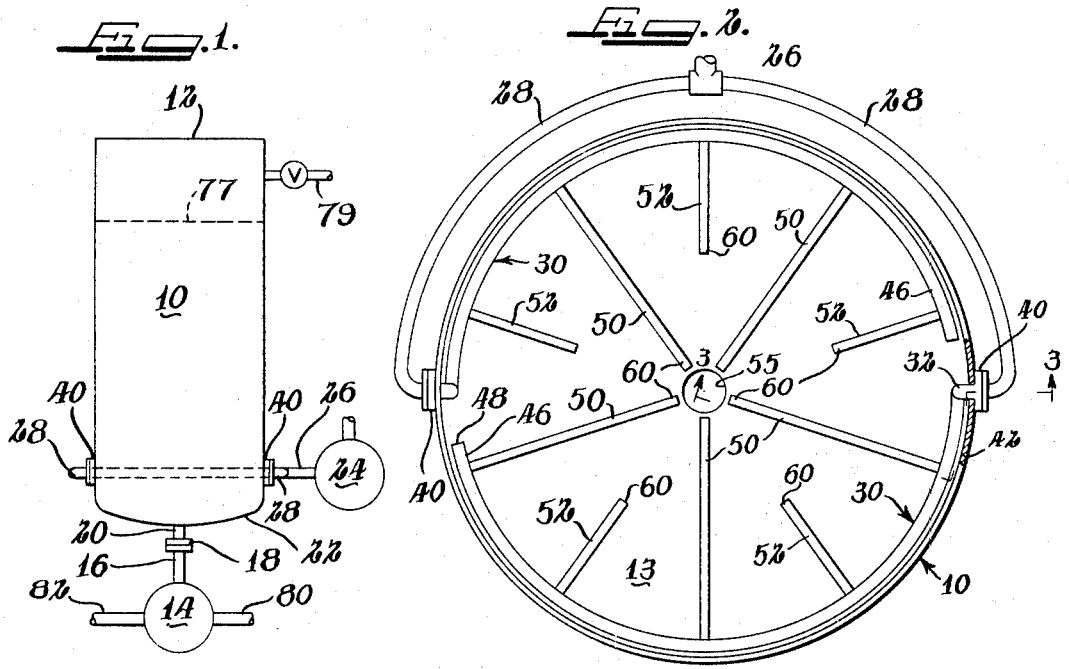
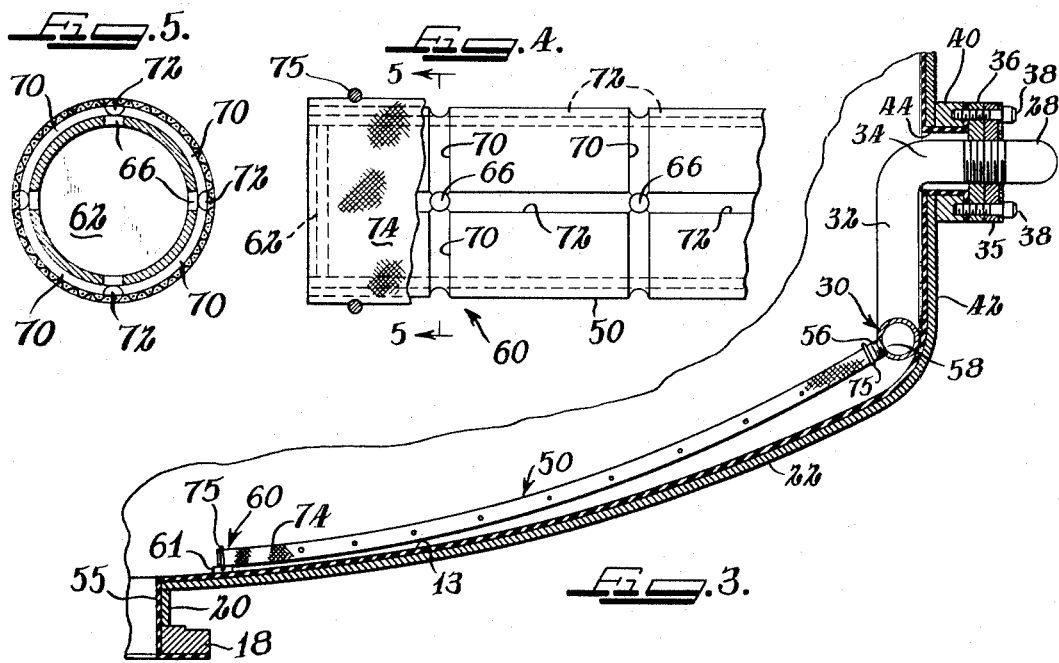

3,391,707
APPARATUS FOR REGENERATING MATERIALS
Clay W. Riley, Palos Heights, and Charles J. Novotny, Cicero, Ill., assignors to Industrial Filter & Pump Mfg. Co., Cicero, Ill., a corporation of Illinois
Filed Sept. 16, 1964, Ser. No. 396,840
6 Claims. (Cl. 137—590)

The present invention relates broadly to apparatus and method for regenerating materials, and more particularly to the regeneration of powdered or granulated resinous materials, and the like, although many other materials including gaseous and liquid fluids and solids can be jointly or severally processed in the present apparatus, and/or by the method hereinafter disclosed.

More specifically, the invention is characterized by apparatus and method of supplying and/or emptying resin material to be regenerated by an ion exchange process into and out of a bottom opening in a vessel. Regenerating fluid is introduced into the vessel around the perimeter thereof, and diffused out of fluid feeders into the resins. For different processes, the resins and fluids may be of a wide variety and can be acid and/or caustic and of several different degrees of acidity or alkalinity.

Prior regenerating vessels for resins and the like have fed regenerating fluids through the bottom of the vessel; and outward radially through feed pipes from a central head or spud. The distribution of fluids in such arrangement is uneven across the area of the bed unless complex secondary tubes are further attached cross-wise to the pipes. Such transverse tubes, when arranged close to the bottom of the vessel, render replacement and cleaning difficult and time-consuming. In addition, the bottoms of the vessel have been made flat adjacent and below the feeders to accommodate cleaning and siphoning of regenerated resins and the like back out through the top of the vessel. Obviously, thorough cleaning between successive batches cannot be attained, and parts can corrode rapidly in the presence of accumulations of acid and/or caustic reesidues. In this art, between different processes involving non-compatible chemical and/or physical processes, thorough cleaning is required. With the prior apparatus and method, manual scrubbing and mopping is often required. In such cases, down-time can become excessive and thus costly.

The fluid feeder apparatus of the present invention affords bottom feeding of the resins; and further facilitates cleaning of the vessel and replacement of parts that may be attacked by acids and caustics employed in different processes. The processing vessel can be washed down by gravitational flow of cleaning fluids down the walls and out of the bottom opening in the vessel. Moreover, the feeder means can be backwashed readily in this process. Closed or sealed pressure vessels can be blown-down quickly in keeping with this invention; and/or vacuum operated and cleaned in facile manner.

Accordingly, a broad object of the present invention is to provide an improved method of treating materials; another object, in keeping with the preceding object, is to regenerate granular materials, and the like; a further object, in keeping with each of the preceding objects, is to regenerate resinous materials in a more facile manner than hitherto attainable with prior apparatus.

Another broad object hereof is to provide improved apparatus for carrying out methods of the above objects; a more specific object is to provide improvements in vessels for processing materials; another object, in keeping with the two preceding objects, is to provide improved means for transferring material to be processed and/or processing fluid to and/or from the interior of a processing vessel.

Further objects and advantages reside in steps in processing, details of construction, and arrangement of parts, and will either be obvious or pointed out in the following specification and claims with the accompanying drawing in view; in which drawing:

FIG. 1 is a schemaic view of a system for processing material including a vessel and fluid transfer apparatus;

FIG. 2 is a plan view looking down at the vessel of FIG. 1;

FIG. 3 is a partial sectional view taken substantially along line 3—3 of FIG. 2;

FIG. 4 is a side view of the distal end of a fluid feeder pipe; and

FIG. 5 is a sectional view taken on line 5—5 of FIG. 4.

Referring now in detail to the drawings, and first to FIG. 1, a vessel 10 is shown as having a top 12 that can be open to atmosphere, if desired. As will appear later, the top 12 can be sealed with a suitable cover to be either operated above or below atmospheric pressure as is desired for different processes. The tank 10 and associated parts may be constructed of suitable corrosion resistant material, or lined with rubber 13, or the like, shown in FIG. 3. The vessel 10 can be gravity loaded with materials which can be drawn off by suitable material transfer apparatus 14 through the center of the bottom 22 of the tank 10. A pipe 16 is secured to a flange 18, in turn welded to a nipple 20 secured to the bottom 22 of the vessel 10.

The material transfer apparatus, and a fluid transfer apparatus 24 may each include suitable valves and power equipment and automatic control mechanism, or other means known in the art, to supply fluid or liquid entrained solids. The apparatus 24 is in fluid communication with a pipe 26 connected to a pair of feed pipes 28, FIG. 2, for supplying headers 30 within the vessel 10. The transfer apparatuses 14 and 24 can either supply materials into or out of the vessel 10, and in certain processes may be suitably controlled to do both during different steps of the processes.

As best shown in FIGS. 2 and 3, the headers 30 are bent upwardly in a leg 32 and outwardly in a fluid inlet and/or outlet leg 34. The leg 34 may be screw threaded at 35 to a conventional flange 36 that is secured by stud bolts or machine screws 38 to a second flange 40 that can be welded to a side wall 42 of the vessel 10.

The headers 30 and feeders 50 and 52 connected thereto can be removed from within the vessel by removing the machine screws 38 and backing off the flange 36 from the threads 35 to release the leg 34 of the header 30. The header 30 can then be tilted and removed bodily and passed out of the open top 12 of the vessel described in this example. The header 30 alone can also be inserted and removed through a hole 44 formed as an opening through the wall portion 42 and the flange 40. When the header 30 is to be removed through the hole 44, the threaded end 35 need not be removed from the flange 36. With the screws 38 removed, the header can be pulled out of the hole 44 or inserted therein. Of course, the feeders 50 and 52 must be detached to permit this operation.

Each of the headers 30 extends from the depending leg 32 adjacent the inside of a wall 42 of the vessel 10 near the point of juncture of the bottom portion 42 of the side wall and the bottom wall 22 of the bottom of the vessel 10. The header 30 ends in a distal end 46 which is closed by a suitable plug 48 that may be threaded for the purpose of permitting blowout cleaning by removing the plug from the end 46 of the header 30.

Each header 30 has connected thereto a predetermined number of feed tubes 50 and 52. As shown in FIG. 2, the longer tubes 50 extend from the inner facing side of the headers 30 and extend substantially to a center opening 55 in the lowermost area of the bottom wall 22 of the vessel 10. The tubes 52 extend for a lesser distance and supply fluid to areas spaced from the areas adjacent the tubes 50. It is to be noted that there are five longer tubes 50 and five shorter tubes 52 alternately arranged to provide substantially uniform distribution of fluid in areas adjacent the tubes 50 and 52 on the top surface of the inside of the bottom wall 22. Of course, there may be more or less than ten tubes and more than two lengths of tubes used for different process purposes.

Each of the feeder tubes 50 and 52 has a threaded end 56 connected to a suitably taped hole 58 facing inwardly and downwardly from the header 30 as best shown in FIG. 3. Each feeder tube can be readily installed in the position shown in FIGS. 2 and 3 or removed by rotating the tubes and the threads 56 thereon. To facilitate these operations, the flange 36 is relieved so that the header 30 can be tilted in certain areas to permit sufficient clearance of distal ends 60 of the tubes 50 and 52. The ends 60 may be provided with saddles 61 welded thereto to space same a suitable distance from the bottom wall 22 of the tank 10. The ends 60 are all identical to each other and closed by welded plugs 62 in the ends thereof, or by other suitable closure means. For example, for mass blowout, the plugs 62 can be screw threaded plugs similar to plugs 48, but of a smaller size. Such mass cleanout forms an important detail step of operation of system.

With the apparatus 14 in operation to withdraw fluid or liquid for cleaning, this cleaning liquid is introduced through pipe 26, first with header plugs 48 removed to blow out the headers 30. The plugs 48 are then replaced and the plugs 60 and 62 removed either severally or collectively to blow out the individual feeder tubes 50 and 52.

In a preferred form of this invention, each of feeder tubes 50 and 52 has a plurality of perforations 66, there being four shown arranged radially in FIG. 5, and two shown parallel to the central axis of the tubes in FIG. 4. There may be more or less perforations, and different spacing, for different desired purposes. Grooved and perforated stock may be used for fabricating all of the tubes 50 and 52. Accordingly, the total number of perforations or orifices 66 in tubes 52 is less than in the tubes 50, because of the tubes 52 being shorter. By way of example only, in a three foot long ¾" nominal size schedule 40 wall tube 50 made of #316 stainless steel, there are one hundred and fifty 3/16" diameter holes forming part of a feeder tube diffusing means.

Each of the perforations or orifices 66 communicates with radial transverse grooves 70 and longitudinal grooves 72 which can be inserted at the orifices or elsewhere. The grooves 70 and 72 are in fluid-flow communication with each other and provide branch channels for flow of fluid longitudinally and around the external surface of the tubes 50 and 52. Fluid introduced through the headers 30, passes through the hollow interiors of the tubes 50 and 52 and diffuses outwardly through the orifices 66, and thus is available for flow along the grooves 70 and 72 substantially around and along the entire surface of the exterior of the tubes 50 and 52.

In order to further assure controlled diffusion of fluid in the apparatus, and for further distributing the fluid evenly beneath the bed of material to be reactivated in the vessel 10, a sleeve 74 that is perforated or formed of fine mesh screen or woven, or otherwise rendered perforate, is placed over the tubes 50 and 52. The ends of the sleeve 74, only one being shown in detail in FIG. 4, are clamped as by a wire 75 or other suitable clamping means in known manner. The tube 50 adjacent the threads 56 may also be provided with clamps 75 for the sleeve 74, as indicated diagrammatically in FIG. 3. As a specific adaptation of this invention, for regenerating granulated resins, the sleeve 74 is made of polypropylene monofilament which may be suitably woven in tubular shapes. Of course, other materials can be used and different processes may permit of such use, or require different materials. However, it is found that polypropylene filament is particularly useful in the specific embodiment of the invention herein disclosed.

Operation

With granulated resin within the vessel 10 up to a level 77, for example, FIG. 1, a suitable reactivating agent in the form of an ionized fluid or liquid is supplied under pressure to pipe 26, pipes 28 and headers 30 to the feed tubes 50 and 52, respectively. A sufficient pressure is applied to the liquid to create approximately a 12" head loss through the 3/16" diameter orifices 66 and the polypropylene sleeves 74 in passing into and beneath the resin particles. An ion exchange will occur and sufficient fluid may be supplied to appear at an overflow 79, FIG. 1. Depending upon the particular degree to be attained in reactivating a resin, different temperatures and times may be involved. Thereafter the ionizing fluid may be withdrawn by the fluid transfer apparatus 24.

In the fluid withdrawing operation, it is preferred that approximately 72" of head loss appear across the sleeves. After the fluid is withrawn, the apparatus 24 can be shut off. The apparatus 14 can then be utilized to pull down and discharge the resin for further processing or use at another stage in the process, of which the ion exchange regeneration of the granulated resin comprises a part of another process.

The fluid transfer apparatus 14 can also be used to convey fluid entrained granulated resin to be regenerated through the pipe 16 and 20 up to the level 77 by providing a suitable transfer liquid, for example, which can overflow through the pipe 79. The transfer liquid can then be withdrawn by either transfer apparatus 14 or 24.

Another significant aspect and advantage of this invention is that the parts may be quickly and readiy cleaned and completely removed of one substance which would not be compatible with a succeeding chemical or physical process. For such cleaning, the vessel 10 is preferably a pressure vessel, not shown, or the top 12 is covered by a pressure resisting head. The regenerating fluid can be withdrawn by the fluid transfer apparatus 24. The resin can be withdrawn through the fluid transfer apparatus 14 and supplied through a pipe 80 to suitable storage or further stages of the process in which regeneration or use of the resins comprises a sub-process or step. The fluid transfer apparatus 14 may then be valved to supply a pipe 82, and the upper pipe 79 can be connected to a source of a cleaning agent of suitable characteristics to wash out one or the other, or both, the vessel 10 and all the parts therein. Thereafter, the transfer apparatus 14 can be shut off, the apparatus 24 put in operation, and the cleaning materials pass through the several feeder tubes in reverse to clean them out along with the fluid transfer apparatus 24, if desired.

After the vessel 10 and associated parts are neutralized, a different process can be carried on in the vessel 10. Different stages or steps of a multistage process can be carried out at different times in a single vessel 10 provided there are suitable well known storage tanks, and the like, for standby periods between succeeding stages or steps of two processes in either related or nonrelated overall processes.

While there is shown and described in detail a preferred apparatus and method for carrying out chemical and physical operations and steps while providing facile cleaning attributes, modifications will occur to others working in the art. Accordingly, it is desired not to be limited in this invention only to the specific apparatus and method shown and described, but by the scope of the following claims.

What is claimed is:
1. A material processing vessel comprising:
   a tank having side walls and a sloping bottom wall terminating in a lowermost material feed opening, fluid feed means for supplying fluid to said vessel to process said material, said fluid feed means including a generally arcuate header and a plurality of perforated feed conduits communicating with said header and extending radially from an area near said feed opening along said bottom wall toward said side walls, said feed conduits resting on said bottom wall.

2. A vessel as set forth in claim 1, wherein alternately disposed ones of said feed conduits are of unequal length to evenly distribute said fluid to said material, said conduits each having a plurality of orifices.

3. A vessel as set forth in claim 1 wherein each of said conduits is provided with longitudinally extending grooves communicating with said orifices, and a plurality of fine mesh screens enclosing respectively said conduits.

4. A vessel as set forth in claim 3, wherein said header is disposed in proximity to the periphery of said tank.

5. A material processing vessel according to claim 1, further including means communicating with said feed opening for supplying resins upwardly into the tank through the feed opening and for drawing the resin downwardly out of the vessel through the feed opening.

6. In a material processing vessel or the like for regenerating granular resins, or the like, said vessel having a downwardly sloped, bottom wall and side walls for containing said resins, a plurality of fluid openings in the vessel in spaced-apart relationship to each other, at least one of the openings being in the bottom wall at the lowermost area thereof providing for movement of said resins through the bottom wall for regeneration of same within the vessel, a header adjacent at least a portion of the perimeter of said vessel in fluid communication with another of the openings, at least one regenerating fluid feeder connected to the header for supplying regenerating fluid to said resin while same is in the vessel, material transfer apparatus for moving resins and fluid to and from the vessel, said apparatus including means communicating with said opening in said bottom wall, supply means for supplying the resins upwardly into the vessel through the bottom wall opening, and said supply means including means for drawing the resin downwardly out of the vessel through the bottom wall opening.

References Cited

UNITED STATES PATENTS

| | | | |
|---|---|---|---|
| 1,620,886 | 3/1927 | Green | 210—279 |
| 1,719,548 | 7/1929 | Hufschmidt | 210—279 |
| 2,154,434 | 4/1939 | Bond | 210—279 |
| 2,461,619 | 2/1949 | Wolcott | 210—279 |
| 3,200,067 | 8/1965 | Levendusky | 210—33 |
| 2,364,775 | 12/1944 | Brice | 210—291 X |
| 3,009,577 | 11/1957 | Gugeler | 210—289 |

MORRIS O. WOLK, *Primary Examiner.*

E. G. WHITBY, S. MARANTZ, *Assistant Examiners.*